United States Patent
Klosinski et al.

(10) Patent No.: US 10,066,632 B2
(45) Date of Patent: Sep. 4, 2018

(54) INLET BLEED HEAT CONTROL SYSTEM

(71) Applicant: GENERAL ELECTRIC COMPANY, Schenectady, NY (US)

(72) Inventors: Joseph Philip Klosinski, Atlanta, GA (US); Sanji Ekanayake, Atlanta, GA (US); John Clisby Blanton, Simpsonville, SC (US); Alston Ilford Scipio, Mableton, GA (US)

(73) Assignee: General Electric Company, Schenectady, NY (US)

( * ) Notice: Subject to any disclaimer, the term of this patent is extended or adjusted under 35 U.S.C. 154(b) by 363 days.

(21) Appl. No.: 14/964,620

(22) Filed: Dec. 10, 2015

(65) Prior Publication Data

US 2017/0167496 A1    Jun. 15, 2017

(51) Int. Cl.
| | |
|---|---|
| F04D 27/02 | (2006.01) |
| F02C 7/047 | (2006.01) |
| F02C 7/052 | (2006.01) |
| F02C 7/24 | (2006.01) |
| F02C 9/18 | (2006.01) |

(52) U.S. Cl.
CPC .......... *F04D 27/0215* (2013.01); *F02C 7/047* (2013.01); *F02C 7/052* (2013.01); *F02C 7/24* (2013.01); *F02C 9/18* (2013.01); *F04D 27/0276* (2013.01); *F05D 2220/32* (2013.01); *F05D 2260/601* (2013.01); *F05D 2260/606* (2013.01); *F05D 2270/101* (2013.01)

(58) Field of Classification Search
CPC .. F04D 27/0215; F04D 27/0276; F02C 7/047; F02C 7/052; F02C 7/24; F02C 9/18; F05D 2220/32; F05D 2260/601; F05D 2260/606; F05D 2270/101
See application file for complete search history.

(56) References Cited

U.S. PATENT DOCUMENTS

| | | | |
|---|---|---|---|
| 5,560,195 A | 10/1996 | Anderson et al. | |
| 6,438,484 B1 | 7/2002 | Andrew et al. | |
| 6,550,253 B2 * | 4/2003 | Mortzheim | F01D 17/105 60/782 |
| 7,617,687 B2 | 11/2009 | West et al. | |
| 8,096,747 B2 * | 1/2012 | Sengar | F01D 11/04 415/1 |
| 8,272,222 B2 | 9/2012 | Zhang et al. | |
| 8,844,258 B2 | 9/2014 | Ekanayake et al. | |
| 2013/0125557 A1 | 5/2013 | Scipio et al. | |
| 2013/0327012 A1 | 12/2013 | Mahabub et al. | |
| 2013/0340439 A1 * | 12/2013 | Ekanayake | F02C 7/047 60/779 |
| 2014/0144124 A1 | 5/2014 | Mazumder et al. | |
| 2017/0218852 A1 | 8/2017 | Klosinski et al. | |

FOREIGN PATENT DOCUMENTS

EP    1 063 402 A2    12/2000

\* cited by examiner

*Primary Examiner* — Igor Kershteyn
(74) *Attorney, Agent, or Firm* — Eversheds-Sutherland (US) LLP

(57) ABSTRACT

The present application provides an inlet bleed heat control system for a compressor of a gas turbine engine. The inlet bleed heat control system provides an inlet bleed heat manifold and an ejector in communication with the inlet bleed heat manifold such that the ejector is in communication with a flow of compressor discharge air and a flow of ambient air.

18 Claims, 2 Drawing Sheets

INLET BLEED HEAT CONTROL SYSTEM

TECHNICAL FIELD

The present application and the resultant patent relate generally to gas turbine engines and more particularly relate to an inlet bleed heat control system with improved flow controls for reduced output losses and heat rate losses when operating at minimum inlet bleed heat flow levels.

BACKGROUND OF THE INVENTION

Efficient and safe gas turbine engine operation requires pressure ratios to be below the operating limit lines of the compressor. Specifically, pressure ratios greater than the operating limit lines may result in compressor surge and the like. Higher pressure ratios may arise in applications where, for example, low BTU fuels or fuels with diluent injections are used and/or at cold ambient temperature conditions. The compressor pressure ratio typically may be larger than the turbine pressure ratio in that the turbine pressure ratio may be subject to pressure losses in the combustor. Compressor surge and the like may cause significant damage and resultant gas turbine engine downtime.

A common solution for compressor pressure ratio protection is the bleeding off of gas turbine compressor discharge air and recirculating the bleed air back to the compressor inlet. Such inlet bleed heat control raises the inlet temperature of the compressor inlet air by mixing the colder ambient air with the bleed portion of the hot compressor discharge air, thereby reducing the air density and the mass flow to the gas turbine.

Current inlet bleed heat manifolds, however, may be sized such that a minimum flow rate is required for even flow distribution. As a result, the minimum bleed heat flow may be in excess of the required flow rate for operating limit line protection and/or anti-icing protection. The use of such a minimum bleed heat flow in excess of actual requirements thus may result in a loss of gas turbine output, heat rate, and efficiency.

SUMMARY OF THE INVENTION

The present application and the resultant patent thus provide an inlet bleed heat control system for a compressor of a gas turbine engine. The inlet bleed heat control system provides an inlet bleed heat manifold and an ejector in communication with the inlet bleed heat manifold such that the ejector is in communication with a flow of compressor discharge air and a flow of ambient air for improved flow control at minimum flow levels.

The present application and the resultant patent further provide a method of operating an inlet bleed heat control system. The method may include the steps of determining if operational parameters require inlet bleed heat, opening a compressor discharge line to an ejector, opening a filter house line to the ejector, mixing the compressor discharge air and the ambient air in the ejector, flowing the mixed air to an inlet bleed heat manifold, and determining if the operational parameters have been achieved by the mixed flow.

The present application and the resultant patent further provide an inlet bleed heat control system for a compressor of a gas turbine engine. The inlet bleed heat control system may include an inlet bleed heat manifold, an ejector in communication with the inlet bleed heat manifold, and a bypass line in communication with the compressor and the inlet bleed heat manifold. The ejector is in communication with a flow of compressor discharge air and a flow of ambient air to create a mixed flow for improved flow control at minimum flow levels.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
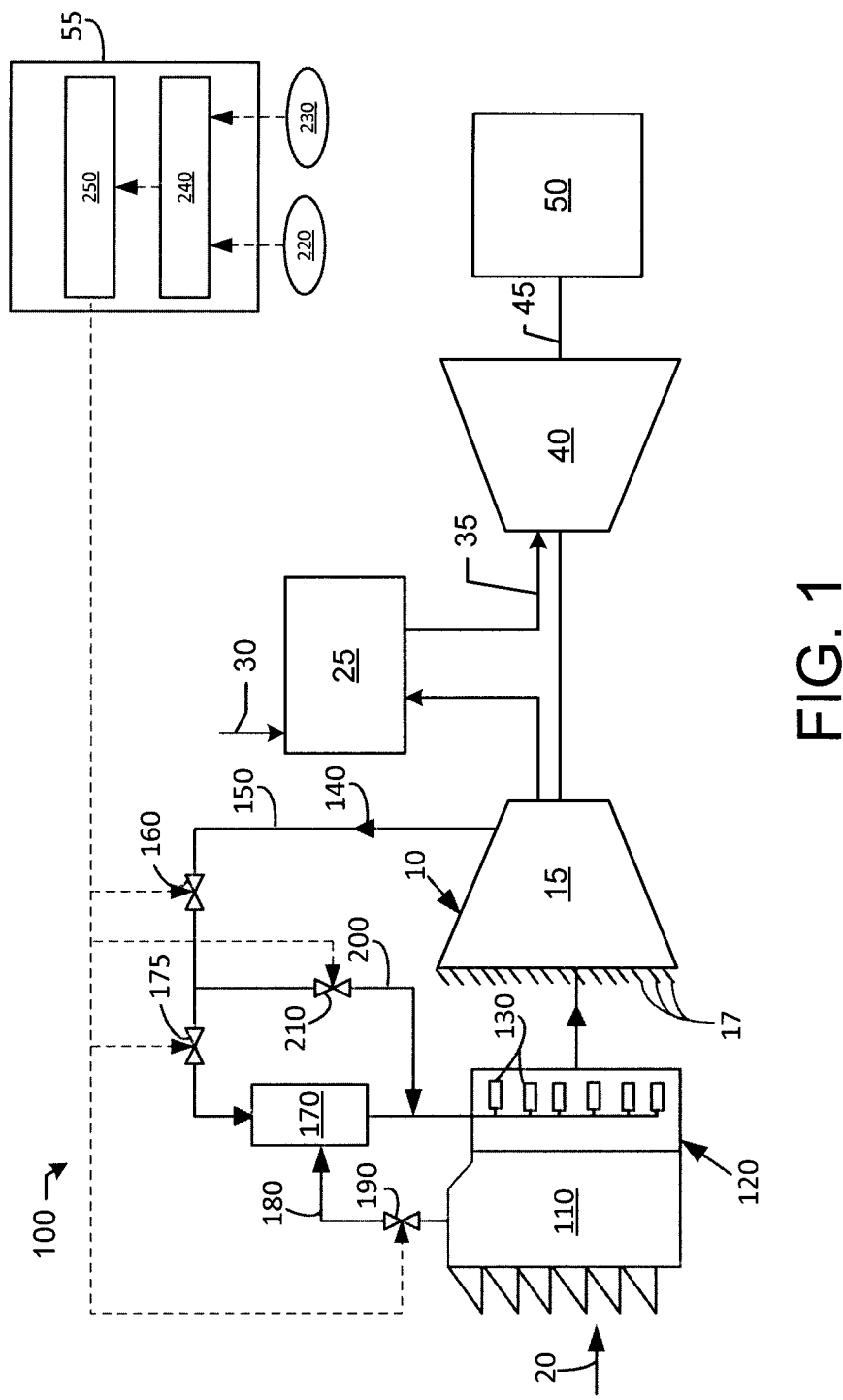
FIG. 1 is a schematic diagram of a gas turbine engine with an inlet bleed heat control system.

Referring now to the drawings, in which like numerals refer to like elements throughout the several views, FIG. 1 shows a schematic view of gas turbine engine 10 as may be used herein. The gas turbine engine 10 may include a compressor 15 with an inlet guide vane assembly 17. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25 positioned in a circumferential array. The flow of combustion gases 35 is delivered in turn to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, liquid fuels, and/or other types of fuels and blends thereof The gas turbine engine 10 may be any one of a number of different gas turbine engines offered by General Electric Company of Schenectady, New York, including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

The gas turbine engine 10 may include a controller 55. The controller 55 may be an independent controller or integrated with a gas turbine control system. An example of the controller 55 is the Speedtronic™ Mark VI™ Control System offered by General Electric Company of Schenectady, New York. Such a control system may be designed to fulfill all gas turbine control requirements, including speed and load control functions and temperature control functions. The control system also may handle sequencing of auxiliary components to allow fully automated start-up, shut-down and cool-down. The control system thus may provide overall gas turbine system protection against adverse operating conditions and the like. All of these functions may be performed in an integrated manner. Other types of control systems may be used herein. Other components and other configurations may be used herein.

The gas turbine engine 10 may include an inlet bleed heat control system 100 as may be described herein. The inlet bleed heat control system 100 may include a number of components positioned between an inlet filter house 110 and the inlet guide vanes 17 of the compressor 15. The inlet filter house 110 may include a number of air filters and/or screens that may remove moisture and particulate matter such as dust and/or debris from the incoming airstream 20. The inlet filter house 110 may be of conventional design and may have any suitable size, shape, or configuration. Other components and other configurations may be used herein.

The inlet bleed heat control system 110 may include an inlet bleed manifold 120. The inlet bleed heat manifold 120 may include a number of acoustic nozzles 130 and the like. Any number of the acoustic nozzles 130 may be used herein. The inlet bleed heat manifold 120 may have any suitable size, shape, or configuration. The inlet bleed heat manifold 120 may be in communication with a heated flow of compressor discharge air 140. The compressor discharge air 140 may be routed to the inlet bleed heat manifold 120 via a compressor discharge line 150. The compressor discharge line 150 may have one or more inlet bleed heat valves 160 thereon. The inlet bleed heat valves 160 may be of conventional design. The inlet bleed heat valves 160 may be in communication with the controller 55.

The inlet bleed heat control system 100 may include an ejector 170. The ejector 170 may be positioned on the compressor discharge line 150 upstream of the inlet bleed heat manifold 120. The compressor discharge line 150 may include an ejector valve 175 thereon upstream of the ejector 170. The ejector valve 175 may be of conventional design. The ejector valve 175 may be in communication with the controller 55. The ejector 170 also may be in communication with the flow of air 20 in the inlet filter house 110 via a filter house line 180. The flow of air 20 may be at an ambient temperature and pressure. A filter house line valve 190 may be positioned thereon. The filter house line valve 190 may be of conventional design. The filter house line valve 190 may be in communication with the controller 55. A bypass line 200 may be in communication with the compressor discharge line 150 so as to bypass the ejector 170 if desired. A bypass valve 210 may be positioned thereon. The bypass valve 210 may be of conventional design. The bypass valve 210 may in communication with the controller 55. Other components and other configurations may be used herein.

The ejector 170 enables mixing of the compressor discharge air 140 with a portion of the flow of ambient air 20 from the inlet filter house 110 to create a mixed flow for use in the inlet bleed heat manifold 120. Generally described, the ejector 170 is a mechanical device with no moving parts. The ejector 170 mixes the two fluid streams based on a momentum transfer. The ejector 170 has a motive air inlet for the high pressure compressor discharge air 140, a suction air inlet for the lower pressure ambient air 20 received from the filter house line 180, a primary nozzle to lower the static pressure, and a diffuser for decelerating the mixed flow and regaining static pressure. The mixed flow thus exits the diffuser at a different pressure and temperature as compared to the incoming compressor discharge air 140 and the flow of ambient air 20 from the inlet filter house 110. The ejector 170 may have any suitable size, shape, or configuration. Other components and other configurations may be used herein.

Operation of the inlet bleed heat control system 100 may be controlled by the controller 55. The controller 55 may receive, for example, operating limit line signals 220, anti-icing control signals 230, and the like. Other types of signals and related sensors may be used herein. The controller 55 thus may include the current logic 240 for operating limit line control, anti-icing control, and the like. The controller 55 also may include ejector logic 250 for operating the ejector 170 in connection with the current logic 240. Other components and other configurations may be used herein.

Figure 2:
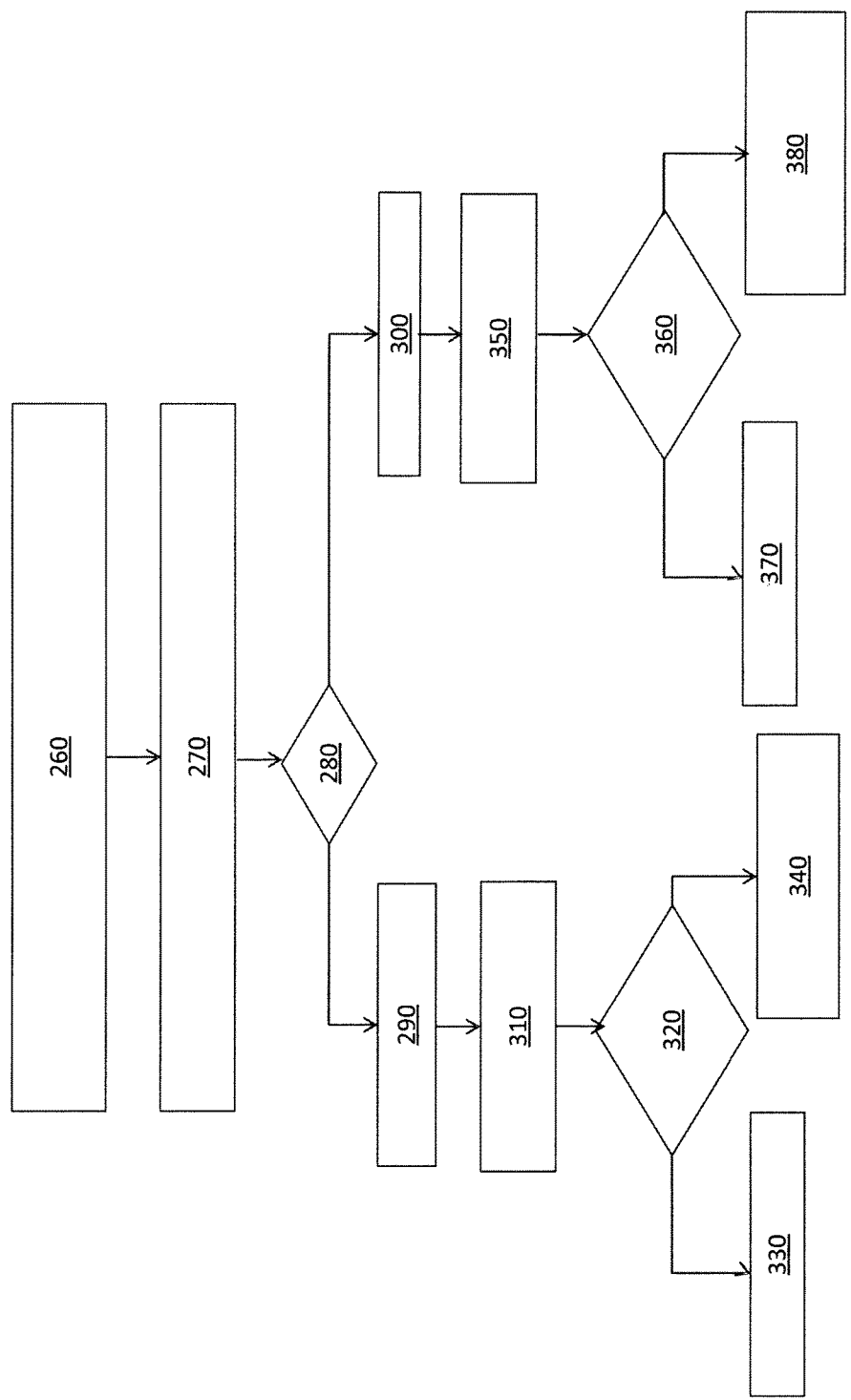
FIG. 2 is a flow chart showing exemplary steps in the operation of the inlet bleed heat control system of FIG. 1.

FIG. 2 shows a flow chart with exemplary steps in the operation of the inlet bleed heat control system 100. At step 260, the gas turbine engine 10 is in operation. At step 270, the controller 55 may determine that the gas turbine engine 10 requires anti-icing protection and/or has reached or is approaching the operating limit line. At step 280, the controller 55 thus may select either anti-icing protection at step 290 and/or operating limit line protection at step 300. If anti-icing protection is required at step 290, the controller 55 may open the inlet bleed heat valve 160, the ejector valve 175, and the filter house line valve 190 to open the ejector 170 at step 310. At step 320, the controller 55 may apply the current logic 240 to determine if the anti-icing requirements have been achieved by only the use of the ejector 170. If achieved, then no additional flow is required at step 330. If not achieved, then the controller 55 may close the ejector valve 175 and the filter house line valve 190 and open the bypass valve 210 so as to bypass the ejector 170 at step 340 so as to provide at least the minimum flow of compressor discharge air 140.

If at step 280, operating limit line protection is desired, the controller 55 may open the inlet bleed heat valve 160, the ejector valve 175, and the filter house line valve 190 to open the ejector 170 at step 350. At step 360, the controller 55 may apply the current logic 240 to determine if operating limit line protection has been achieved by only the use of the ejector 170. If achieved, then no additional flow is required at step 370. If not achieved, then the controller 55 may close the ejector valve 175 and the filter house line valve 190 and open the bypass valve 210 so as to bypass the ejector 170 at step 380 so as to provide at least the minimum flow of compressor discharge air 140. These steps are exemplary only. Other and different steps may be performed herein in other and different order.

The inlet bleed heat control system 100 thus may limit the use of the compressor discharge air 140. The minimum bleed heat flow rate thus may be about 0% to about 1% W2 (compressor airflow) as compared to conventional rates of about 0.5% to about 1% W2. The inlet bleed heat control system 100 thus allows greater control of the required bleed heat flow rate so as to reduce overall output loses and heat rate losses associated with operating at the current minimum bleed heat flow levels. Overall gas turbine output and efficiency thus may be improved.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. An inlet bleed heat control system for a compressor of a gas turbine engine, comprising:
   an inlet bleed heat manifold; and
   an ejector in communication with the inlet bleed heat manifold;
   the ejector in communication with a flow of compressor discharge air and a flow of ambient air;
   wherein the ejector is in communication with a filter house line with the flow of ambient air; and
   wherein the filter house line comprises a filter house line valve thereon.

2. The inlet bleed heat control system of claim 1, wherein the ejector is in communication with a compressor discharge line with the flow of compressor discharge air.

3. The inlet bleed heat control system of claim 2, wherein the compressor discharge line comprises a compressor discharge valve thereon.

4. The inlet bleed heat control system of claim 3, wherein the compressor discharge line comprises an ejector valve thereon.

5. The inlet bleed heat control system of claim 1, further comprising an ejector bypass line positioned between the compressor and the inlet bleed heat manifold.

6. The inlet bleed heat control system of claim 5, wherein the bypass line comprises a bypass valve thereon.

7. The inlet bleed heat control system of claim 1, wherein the inlet bleed heat manifold comprises a plurality of acoustic nozzles.

8. The inlet bleed heat control system of claim 1, further comprising a controller.

9. The inlet bleed heat control system of claim 8, wherein the controller comprises anti-icing signals.

10. The inlet bleed heat control system of claim 8, wherein the controller comprises operating limit line signals.

11. The inlet bleed heat control system of claim 1, further comprising a filter house upstream of the inlet bleed heat manifold.

12. The inlet bleed heat control system of claim 1, further comprising a plurality of inlet guide vanes downstream of the inlet bleed heat manifold.

13. A method of operating an inlet bleed heat control system, comprising:

determining if operational parameters require inlet bleed heat;

opening a compressor discharge line to an ejector;

opening a filter house line to the ejector;

mixing compressor discharge air and ambient air in the ejector;

flowing the mixed air to an inlet bleed heat manifold; and determining if the operational parameters have been achieved by the mixed flow.

14. An inlet bleed heat control system for a compressor of a gas turbine engine, comprising:

an inlet bleed heat manifold;

an ejector in communication with the inlet bleed heat manifold;

the ejector in communication with a flow of compressor discharge air and a flow of ambient air to create a mixed flow; and a bypass line in communication with the compressor and the inlet bleed heat manifold.

15. The inlet bleed heat control system of claim 14, wherein ejector is in communication with a filter house line with a filter house line valve thereon.

16. The inlet bleed heat control system of claim 14, wherein the ejector is in communication with a compressor discharge line with a compressor discharge valve thereon and an ejector valve thereon.

17. The inlet bleed heat control system of claim 14, wherein the bypass line comprises a bypass valve thereon.

18. The inlet bleed heat control system of claim 14 further comprising a controller with anti-icing signals and operating limit line signals.

\* \* \* \* \*